US012354783B2

(12) United States Patent
Hsiao et al.

(10) Patent No.: US 12,354,783 B2
(45) Date of Patent: Jul. 8, 2025

(54) POWER CONVERSION MODULE

(71) Applicant: CHICONY POWER TECHNOLOGY CO., LTD., New Taipei (TW)

(72) Inventors: Yung Hung Hsiao, New Taipei (TW); Chia Hsien Yen, New Taipei (TW); Che Han Li, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 921 days.

(21) Appl. No.: 17/397,304

(22) Filed: Aug. 9, 2021

(65) Prior Publication Data

US 2022/0208436 A1 Jun. 30, 2022

(30) Foreign Application Priority Data

Dec. 29, 2020 (TW) ................................ 109146721

(51) Int. Cl.
*H01F 27/29* (2006.01)
*H01F 27/06* (2006.01)
(Continued)

(52) U.S. Cl.
CPC ......... *H01F 27/2852* (2013.01); *H01F 27/06* (2013.01); *H01F 27/26* (2013.01);
(Continued)

(58) Field of Classification Search
CPC ...... H01F 27/2852; H01F 27/06; H01F 27/26; H01F 27/29; H01F 27/306;
(Continued)

(56) References Cited

U.S. PATENT DOCUMENTS

2008/0088401 A1* 4/2008 Wei ..................... H01F 27/2804 336/182
2014/0009251 A1* 1/2014 Hsu ....................... H01F 27/085 336/57
(Continued)

FOREIGN PATENT DOCUMENTS

CN 101090029 A 12/2007
CN 101170004 A 4/2008
(Continued)

OTHER PUBLICATIONS

China National Intellectual Property Administration (CNIPA), “First Office Action”, issued on Jul. 10, 2024.
(Continued)

*Primary Examiner* — Tuyen T Nguyen
(74) *Attorney, Agent, or Firm* — MUNCY, GEISSLER, OLDS & LOWE, P.C.

(57) ABSTRACT

A power conversion module includes a circuit board and a transformer mounted on the circuit board. The transformer includes a primary winding, a plurality of secondary windings, and a magnetic core assembly. The secondary winding includes a plurality of conductive plates each has a main body, two pins and two intermediate segments. The two pins extends along a first direction and couples to the main body via intermediate segments extending along a second direction; the transformer is electrically connected to the circuit board through the pins; wherein the main body has an opening, and the intermediate segments are positioned at two sides of the opening. The magnetic core assembly includes a middle post, and a coil section of the primary winding and the main bodies of the conductive plates are arranged in a staggered configuration and surround the middle post.

12 Claims, 15 Drawing Sheets

(51) Int. Cl.
*H01F 27/26* (2006.01)
*H01F 27/28* (2006.01)
*H01F 27/30* (2006.01)

(52) U.S. Cl.
CPC .......... *H01F 27/29* (2013.01); *H01F 27/306* (2013.01); *H01F 2027/065* (2013.01)

(58) Field of Classification Search
CPC ......... H01F 2027/065; H01F 2027/297; H01F 27/2866; H01F 27/292; H01F 27/346; H01F 27/28; H01F 27/266
See application file for complete search history.

(56) References Cited

U.S. PATENT DOCUMENTS

| | | | |
|---|---|---|---|
| 2015/0221431 | A1 | 8/2015 | Wu Li |
| 2020/0105461 | A1 | 4/2020 | Fu et al. |

FOREIGN PATENT DOCUMENTS

| | | | | |
|---|---|---|---|---|
| CN | 202977117 | U | | 6/2013 |
| CN | 105655098 | A | * | 6/2016 |
| CN | 106160476 | A | | 11/2016 |
| CN | 206961648 | U | | 2/2018 |
| CN | 109065332 | A | | 12/2018 |
| CN | 209056362 | U | | 7/2019 |
| CN | 106160412 | A | | 9/2019 |
| CN | 110266138 | A | | 9/2019 |
| CN | 110970210 | A | | 4/2020 |
| CN | 210722717 | U | | 6/2020 |
| TW | 200820278 | A | | 5/2008 |
| TW | 200832460 | A | | 8/2008 |
| TW | M417638 | U | | 12/2011 |
| TW | 201214477 | A | | 4/2012 |
| TW | M438692 | U | | 10/2012 |
| TW | I443693 | B | | 7/2014 |
| TW | I520162 | B | | 2/2016 |
| TW | M542845 | U | | 6/2017 |
| TW | 201805967 | A | | 2/2018 |
| TW | 202001944 | A | | 1/2020 |

OTHER PUBLICATIONS

Notice of Allowance dated Jan. 17, 2025 issued by China National Intellectual Property Administration for corresponding China application 202110104920.8.

Search report dated Jan. 17, 2025 issued by China National Intellectual Property Administration for corresponding China application 202110104920.8.

* cited by examiner

POWER CONVERSION MODULE

PRIORITY CLAIM AND CROSS-REFERENCE

This application claims priority of Taiwan application No. 109146721, filed on Dec. 29, 2020, which is incorporated by reference in its entirety.

TECHNICAL FIELD

The present disclosure relates to a power conversion module, and more particularly, to a power conversion module employed in high power and medium to high wattage power supply.

DISCUSSION OF THE BACKGROUND

A magnetic component is a core member of a power supply. It is a major challenge for developers to design the magnetic component in an alternating current (AC) or direct current (DC) power supply adapted to provide high wattage and high efficiency, and to take care of space utilization, material selection and design cost at the same time.

SUMMARY

The present application provides a power conversion module to reduce leakage inductance and having reduced size.

The present application provides a power conversion module, including: a circuit board including at least one conductive pattern disposed thereon; and a transformer, disposed on the circuit board, the transformer including: a primary winding, including at least one coil section; a plurality of secondary windings, including a plurality of conductive plates, each of the conductive plates including: two pins, extending along a first direction, wherein the transformer is physically connected to the circuit board through the two pins for electrically connecting to the circuit board; a single-layered main body, having an opening; and two intermediate segments, extending along a second direction, wherein the single-layered main body is coupled to the two pins via the two intermediate segments, and the two intermediate segments are located at both sides of the opening, and the second direction is perpendicular to the first direction; and, a magnetic core assembly, including a middle post, wherein the coil section and the single-layered main bodies of the conductive plates are arranged in a staggered configuration, the middle post passes through a center of the coil section and the single-layered main bodies of the conductive plates, and the pins of the conductive plates are arranged on opposite sides of the middle post.

In the transformer of the power conversion module provided in the present application, the coil section of the primary winding and the conductive plates of the secondary windings are arranged in a staggered configuration, thereby reducing the leakage inductance. In addition, the pins of the conductive plates of the secondary windings are distributed at opposite sides of the middle post of the magnetic core assembly, and the secondary windings are electrically connected to the circuit board through the pins, thereby reducing the size of the transformer and increasing the flexibility in applications.

BRIEF DESCRIPTION OF THE DRAWINGS

A more complete understanding of the present disclosure may be derived by referring to the detailed description and claims The disclosure should also be understood to be coupled to the figures' reference numbers, which refer to similar elements throughout the description.

DETAILED DESCRIPTION

Figure 1:
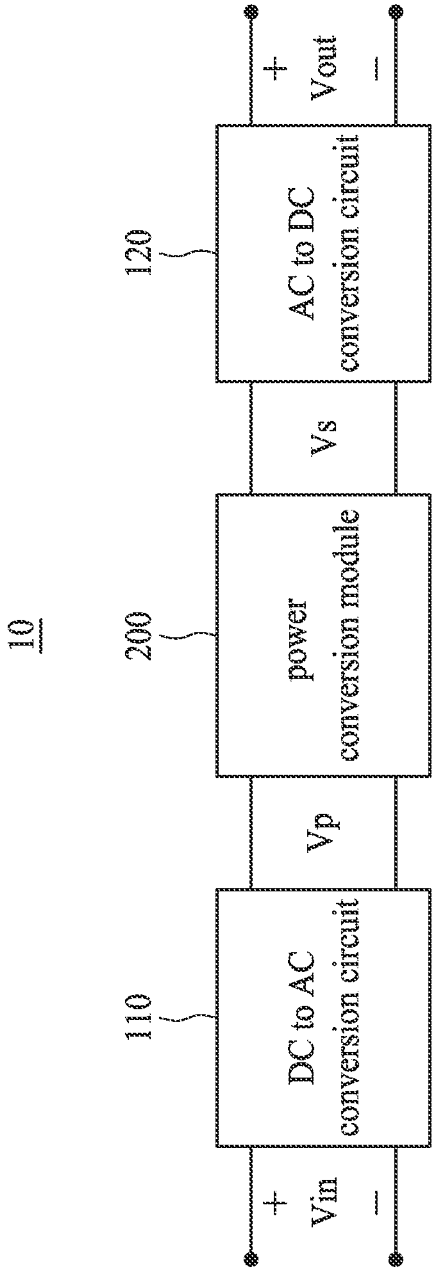
FIG. 1 is a circuit block diagram of a power conversion system in accordance with some embodiments of the present application.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. It will be understood that when an element is referred to as being "connected to" or "coupled to" another element, it may be directly connected to or coupled to the other element, or intervening elements may be present.

Further, spatially relative terms, such as "beneath," "below," "lower," "above," "upper" and the like, may be used herein for ease of description to describe one element or feature's relationship to another element(s) or feature(s)

as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a circuit block diagram of a power conversion system in accordance with some embodiments of the present application. Referring to FIG. 1, the power conversion system 10 includes a direct current (DC) to alternating current (AC) conversion circuit 110, an AC to DC conversion circuit 120 and a power conversion module 200. The DC to AC conversion circuit 110 receives a DC input voltage Vin and is applied to convert the DC input voltage Vin to an AC input voltage Vp. The power conversion module 200 is configured to convert the AC input voltage Vp to an AC output voltage Vs, and the AC to DC conversion circuit 120 is applied to convert the AC output voltage Vs to a DC output voltage Vout. The DC to AC conversion circuit 110 may be a full-bridge LLC resonant circuit or a phase-shifted full-bridge LLC circuit, and the AC to DC conversion circuit 120 may be a full-bridge synchronous rectification circuit.

Figure 2:
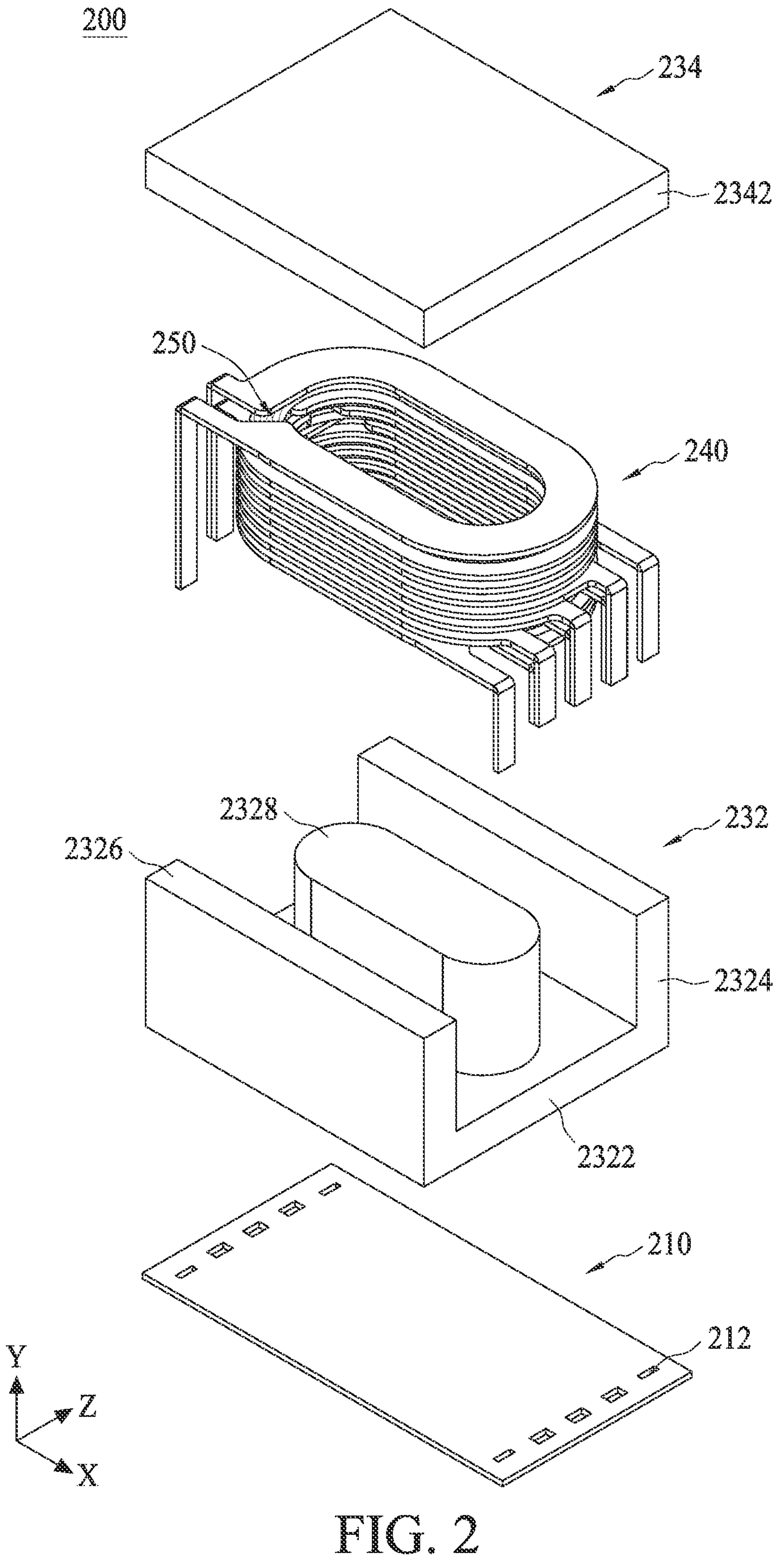
FIG. 2 is a partially exploded view of a power conversion module in accordance with an embodiment of the present application.
Figure 3:
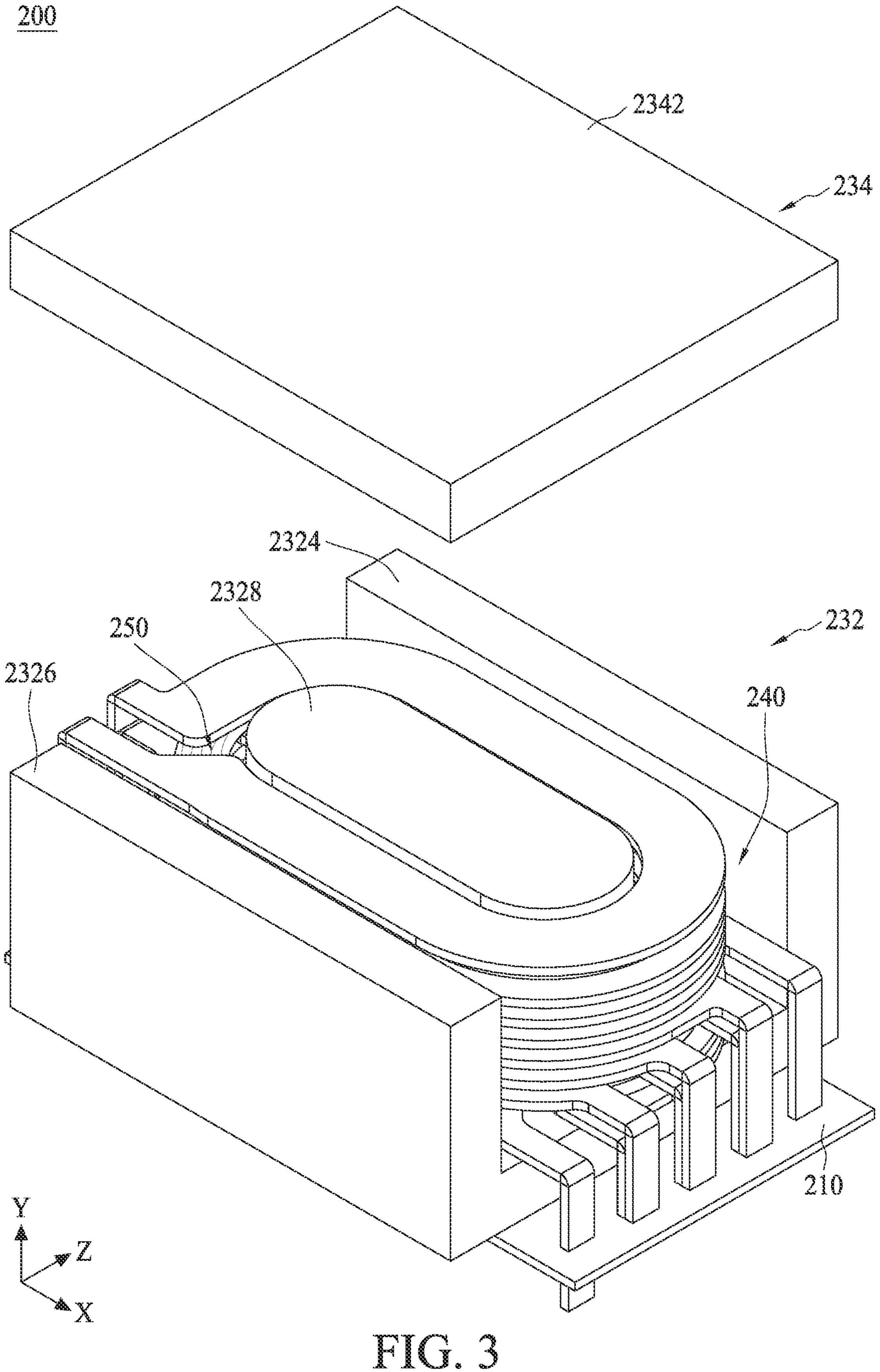
FIG. 3 is a partially assembled view of the power conversion module in accordance with an embodiment of the present application.
Figure 4:
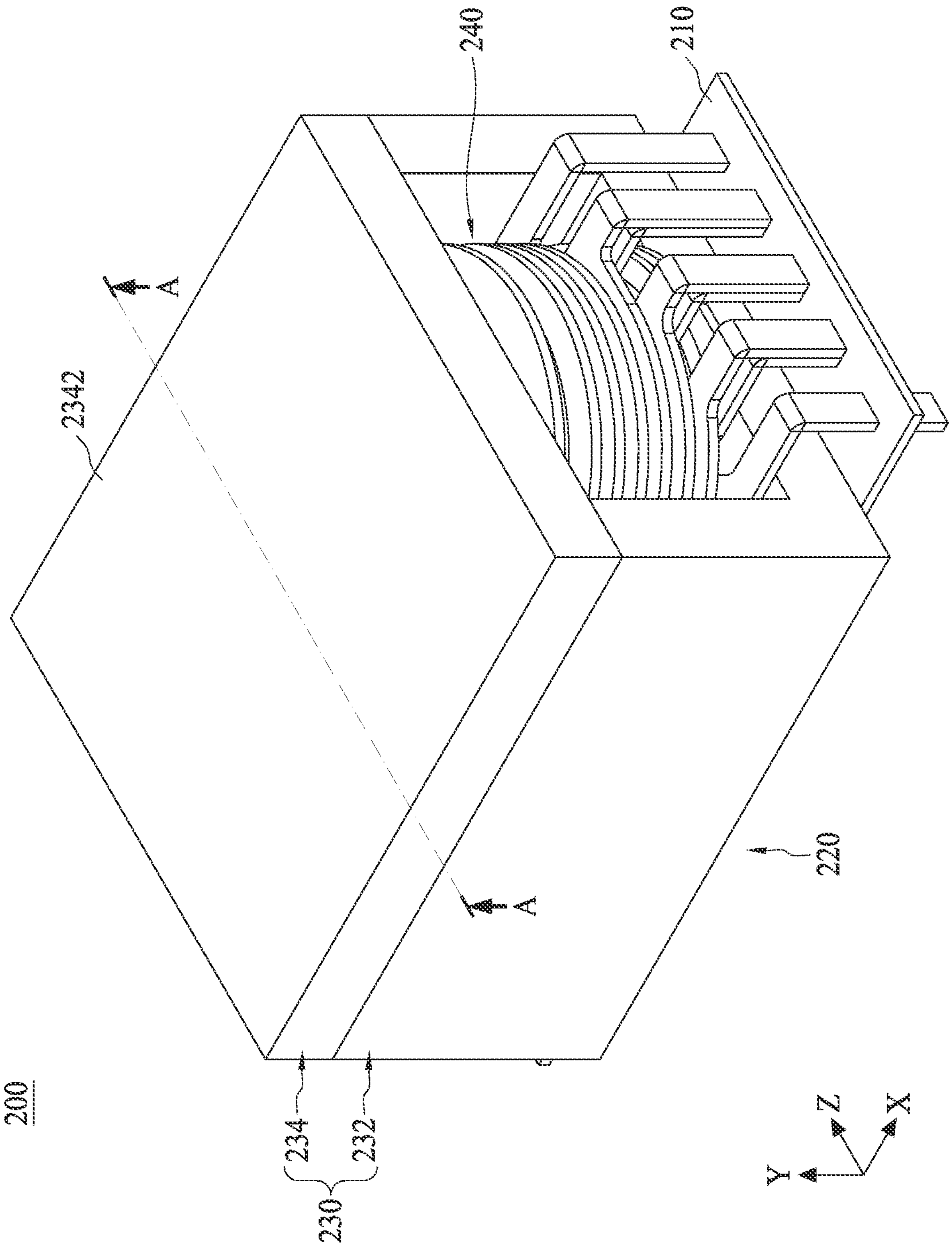
FIG. 4 is an assembled view of the power conversion module in accordance with an embodiment of the present application.
Figure 5:
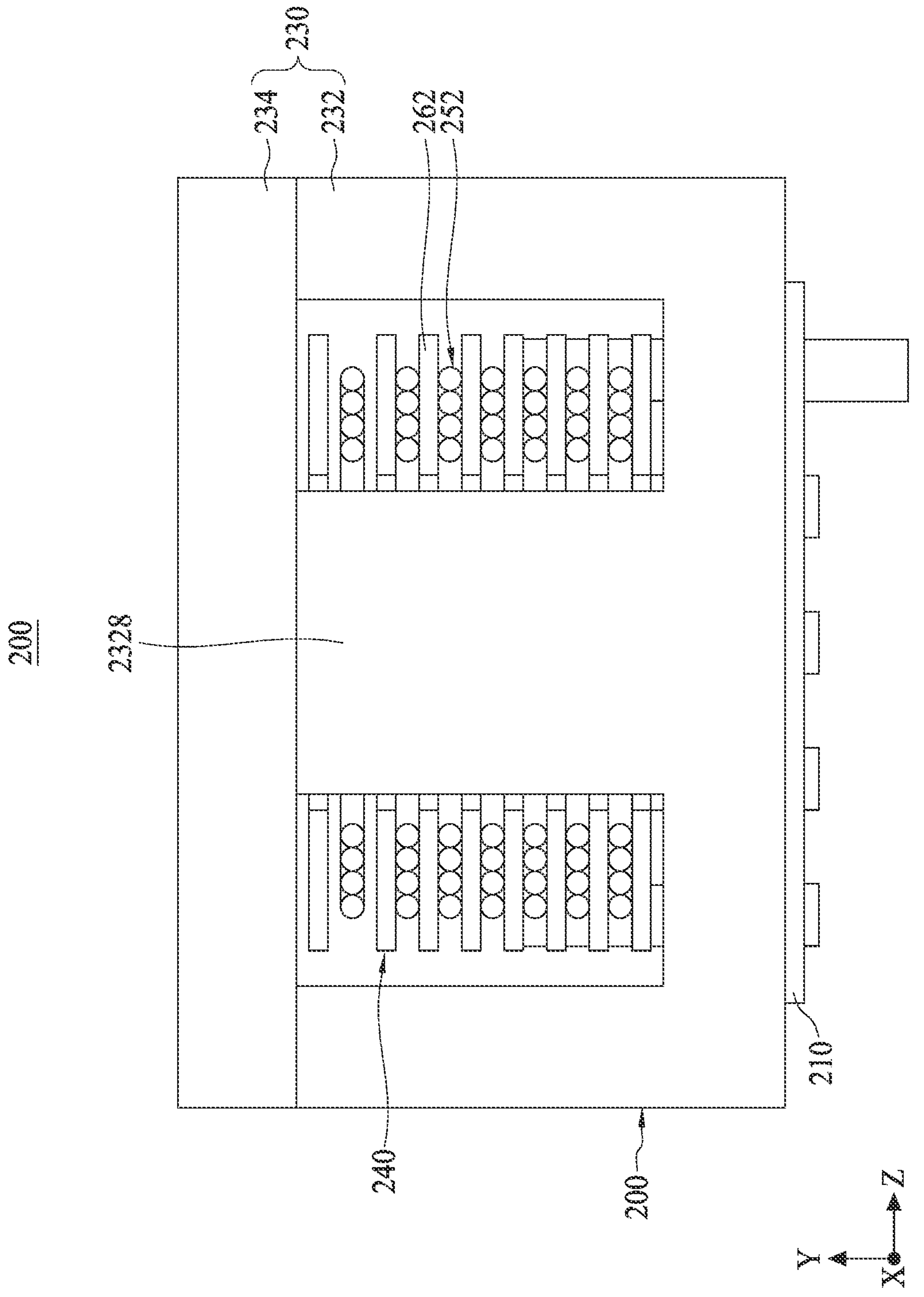
FIG. 5 is a cross-sectional view taken along the line A-A in FIG. 4.

FIG. 2 is a partially exploded view of the power conversion module in accordance with some embodiments of the present application. FIG. 3 is a partially assembled view of the power conversion module in accordance with some embodiments of the present application. FIG. 4 is an assembled view of the power conversion module in accordance with some embodiments of the present application. FIG. 5 is a cross-sectional view taken along the line A-A in FIG. 4. Referring to FIGS. 2 to 5, the power conversion module 200 includes a circuit board 210 and a transformer 220. The transformer 220, mounted on the circuit board 210, includes a magnetic core assembly 230 and a winding assembly 240. The magnetic core assembly 230 generates an inductive magnetic field for coupling the winding assembly 240, so that the winding assembly 240 can be applied to convert the AC input voltage Vp to the AC output voltage Vs.

The magnetic core assembly 230 includes a first plate 2322, a second plate 2342, a first side post 2324, a second side post 2326, and a middle post 2328; the first plate 2322, the second plate 2342, the first side post 2324, and the second side post 2326 collectively constitute a rectangular ring body, and the middle post 2328 is disposed between the first and second side posts 2324 and 2326 and is in contact with the first plate 2322 and the second plate 2342. As shown in FIG. 2, the first plate 2322, the first side post 2324, the second side post 2326 and the middle post 2328 are integrally connected to form a first magnetic core member 232 in one piece, and the second plate 2342 functions as a second magnetic core member 234. In other words, the magnetic core assembly 230 includes the first magnetic core member 232 having an E shape and the second magnetic core member 234 having an I shape. In some embodiments, the magnetic core assembly 230 may include the first magnetic core member 232 and the second magnetic core member 234 having symmetrical E shapes. In FIGS. 2 and 3, the middle post 2328 of the first magnetic member 232 is an elliptic cylinder and extends outward from a center of the first plate 2322, and the first side post 2324 and the second side post 2326, disposed on opposite sides of the middle post 2328, extend outward from edges of the first plate 2322. In some embodiments, the middle post 2328 of the first magnetic core member 232 may be eccentrically connected to the first plate 2322. In some embodiments, the middle post 2328 may be a rectangular cylinder.

Figure 6:
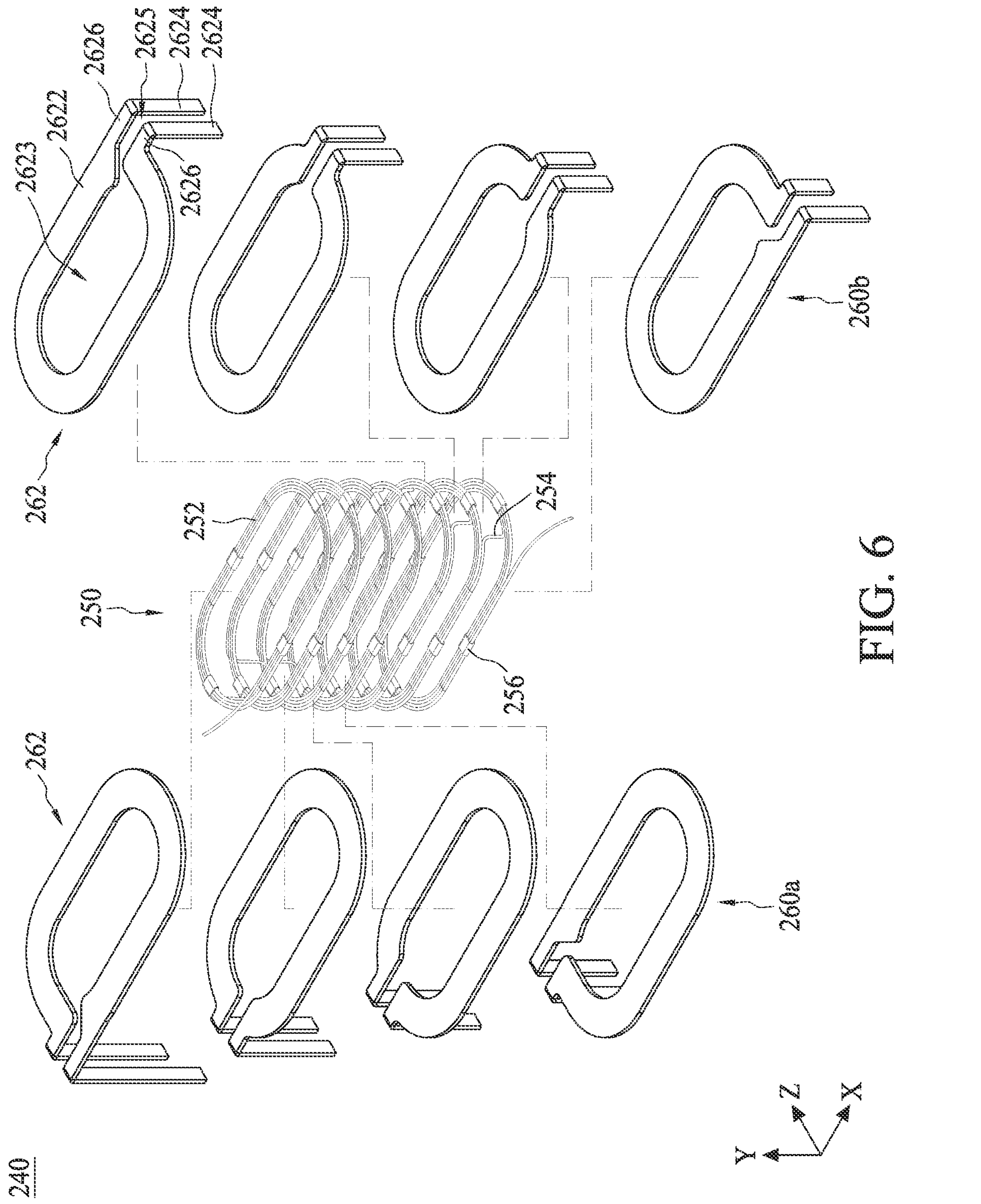
FIG. 6 is an exploded view of a winding assembly in accordance with an embodiment of the present application.
Figure 7:
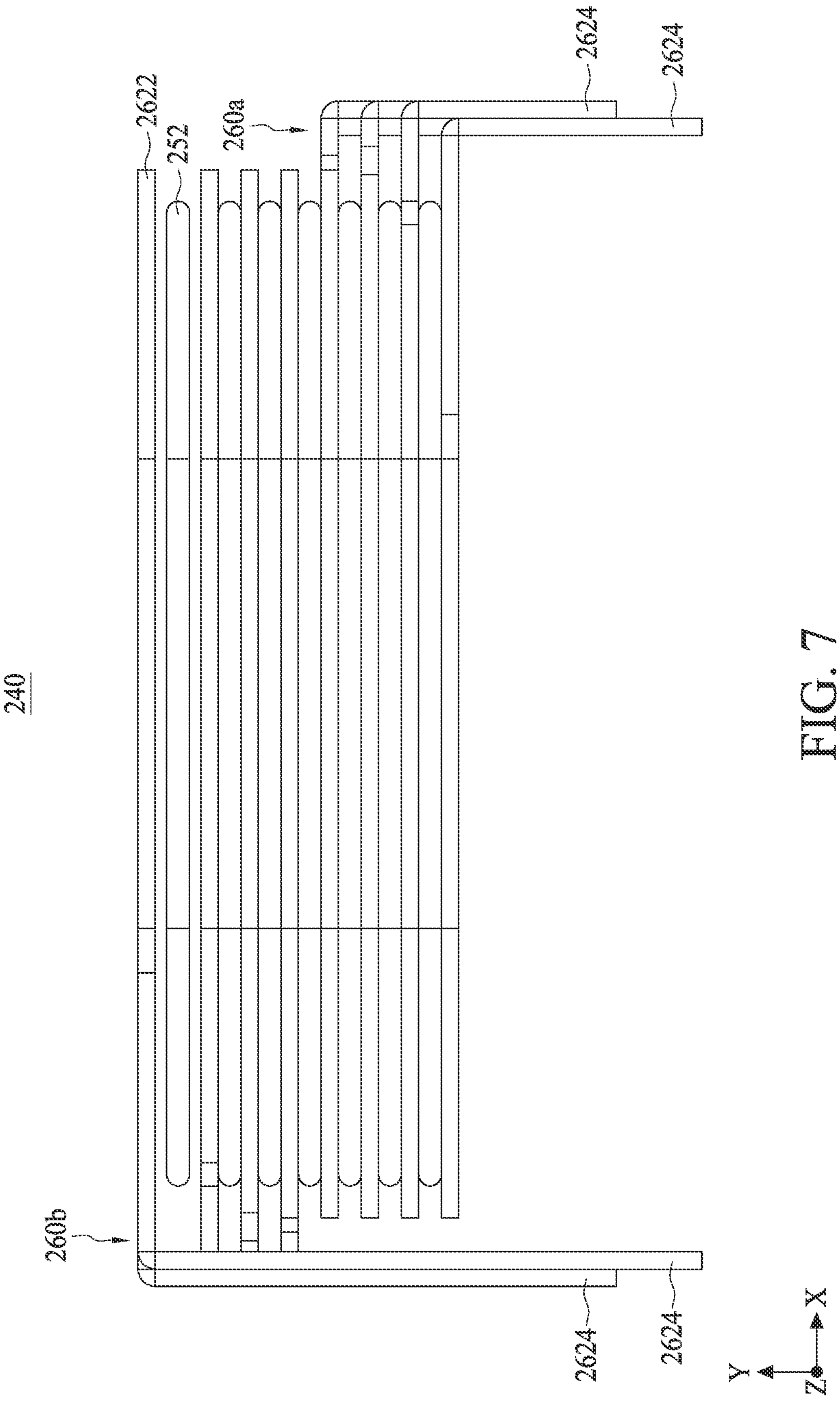
FIG. 7 is a front view of the winding assembly in accordance with an embodiment of the present application.
Figure 8:
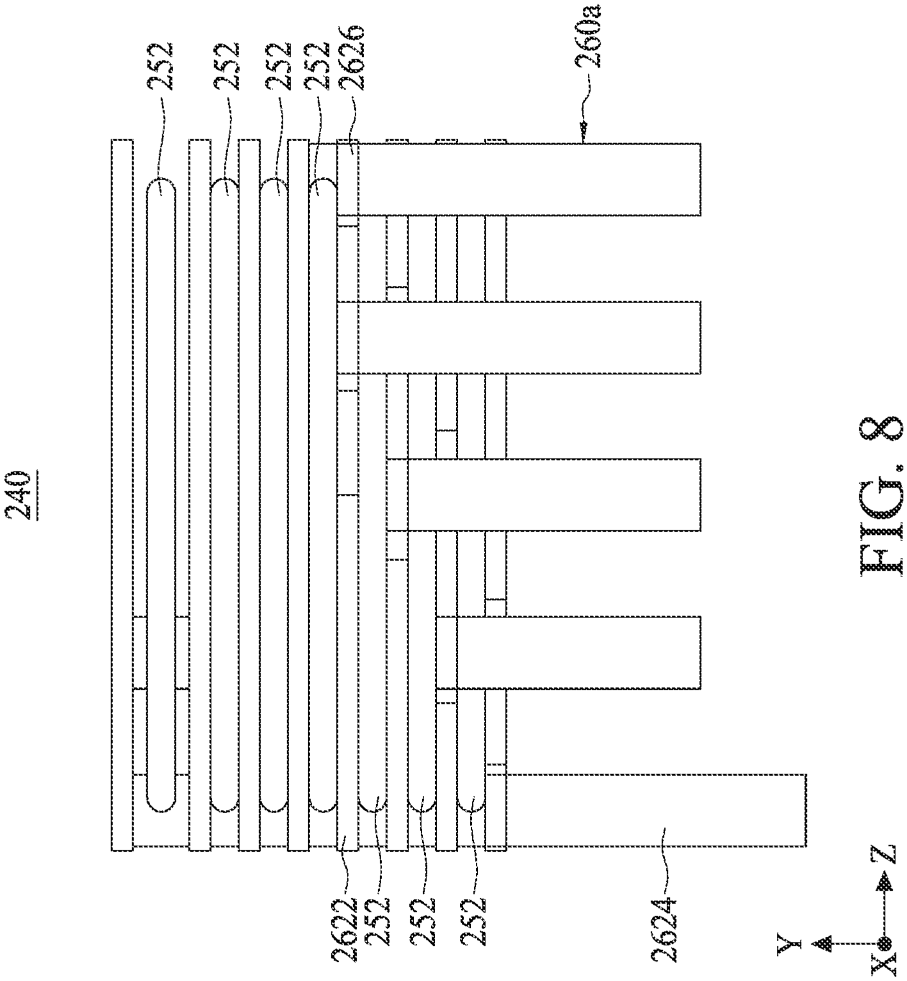
FIG. 8 is a side view of the winding assembly in accordance with an embodiment of the present application.
Figure 9:
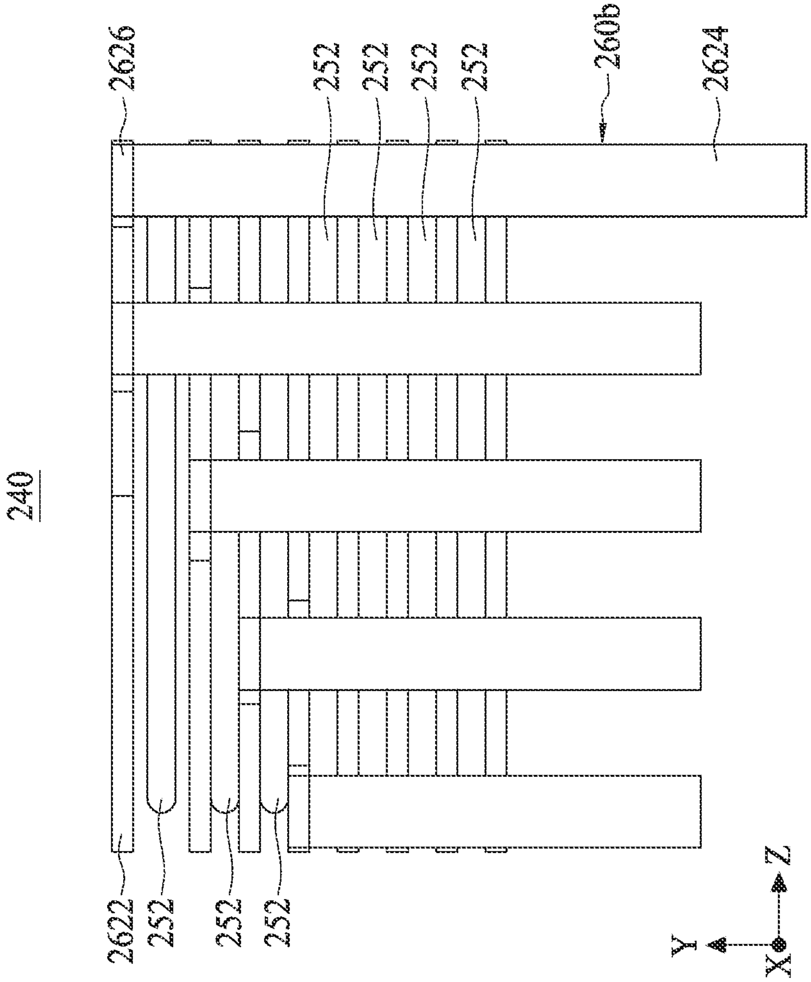
FIG. 9 is a side view of the winding assembly in accordance with an embodiment of the present application.

FIG. 6 is an exploded view of the winding assembly 240, FIG. 7 is a front view of the winding assembly 240, and FIGS. 8 and 9 are side views of the winding assembly 240. Referring to FIGS. 6 to 9, the winding assembly 240 includes a primary winding 250 and a plurality of secondary windings 260*a* and 260*b*. The primary winding 250 is electrically coupled to the DC to AC conversion circuit 110 shown in FIG. 1 for receiving the AC input voltage Vp; the secondary windings 260*a* and 260*b* are electrically coupled to the AC to DC conversion circuit 120 shown in FIG. 1 and configured to provide the AC output voltage Vs to the AC to DC conversion circuit 120.

As shown in FIG. 6, the primary winding 250 includes a plurality of coil sections 252 and a plurality of intermediate sections 254, wherein the coil sections 252 are electrically coupled to each other through the intermediate sections 254. Specifically, the primary winding 250 includes the coil sections 252 and the intermediate sections 254 connected in a staggered configuration. Each of the coil sections 252 of the primary winding 250 may be wound in a clockwise or a counter-clockwise direction using one wire. In addition, a thickness of each of the coil sections 252 is designed to be equal to a diameter of the wire. That is, the coil section 252 of the primary winding 250 is wound spirally without being closed-up and is wound along a plane with a normal direction of a first direction Y.

In order to reduce the production operations and avoid malfunction of the transformer 220 caused by poor contact or disconnecting between the coil sections 252 and the intermediate sections 254, the coil sections 252 and the intermediate sections 254 of the primary winding 250 may be formed by a single wire to achieve the connection in one piece. In some embodiments, the wire can be a single-core or multi-core copper or aluminum wire coated with an insulation, such as an enameled wire. The primary winding 250 may further include a plurality of securing members 256 fastened at portions of the coil sections 252 to secure the structure of the coil sections 252 and ensure that the thickness of each of the coil sections 252 equals the diameter of the wire. The securing members 256 may be, for example, flexible adhesive tape.

The secondary windings 260*a* and 260*b* include a plurality of conductive plates 262, respectively. Each conductive plate 262 includes a main body 2622, two pins 2624, and two intermediate segments 2626; the main body 2622 is connected to the pins 2624 through the intermediate segments 2626, wherein the pins 2624 extend along the first direction Y, and the intermediate segments 2626 extend along a second direction X substantially perpendicular to the first direction Y. The main body 2622, the pins 2624 and the intermediate segments 2626 of each conductive plate 262 are integrally connected. For example, by using molding or stamping processes, the main body 2622, the pins 2624 and the intermediate segments 2626 are formed as a flat and single-layered plate. Open ends of the single-layered plate are then bended to form the pins 2624 for connecting to the circuit board 210. In some embodiments, the main body 2622, the pins 2624 and the intermediate segments 2626 have the same thicknesses.

Figure 10:
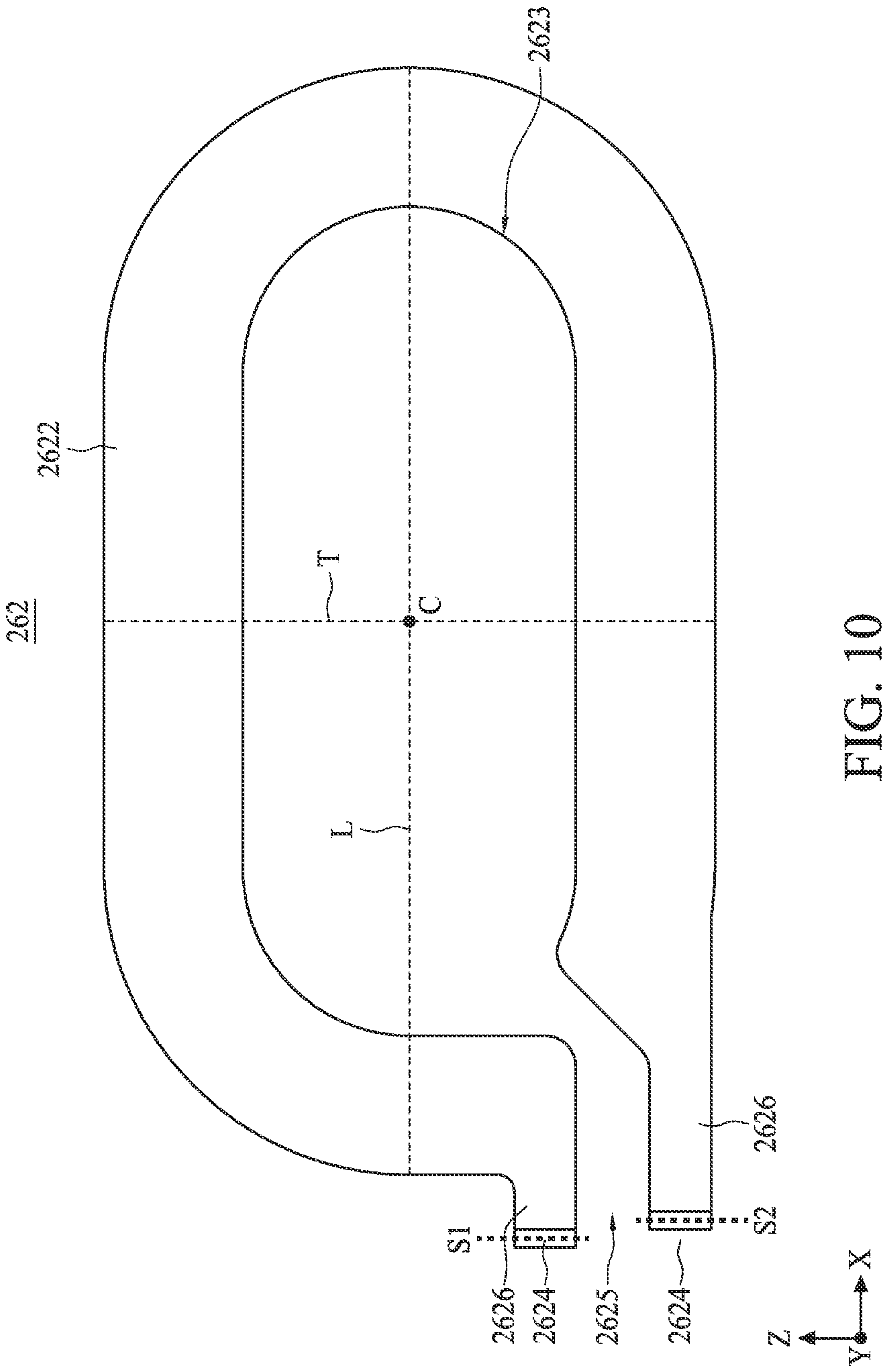
FIG. 10 is a top view of a conductive plate in accordance with an embodiment of the present application.

FIG. 10 is a top view of the conductive plate 262. Referring to FIGS. 6 and 10, the main body 2622 of the conductive plate 262 may have a substantially ellipsoidal contour and includes a through hole 2623 and an opening 2625 leading to the through hole 2623. The through hole

2623 is provided at a center of the main body 2622 for allowing the middle post 2328 of the magnetic core assembly 230 to pass therethrough; the through hole 2623 has a profile corresponding to the middle post 2328, and the through hole 2623 and the opening 2625 together allow the main body 2622 to substantially have a C-shape. The intermediate segment 2626 is disposed at sides of the opening 2625 and used for connecting the main body 2622 and the pins 2624 which are substantially in a perpendicular arrangement. Hereby, the major axis L is defined as the longest line intersecting an outer contour of the main body 2622 at two points and through a center point C of the main body 2622, and the minor axis T is defined as a line passing through the center point C and perpendicular to the major axis L. As shown in FIG. 10, the major axis L intersects the curved segments of the main body 2622, the minor axis T intersects the straight segments of the main body 2622, and the opening 2625 is located at one of the curved segments on the main body 2622. That is, the opening 2625 is closer to ends of the major axis L than ends of the minor axis T.

Figure 11:
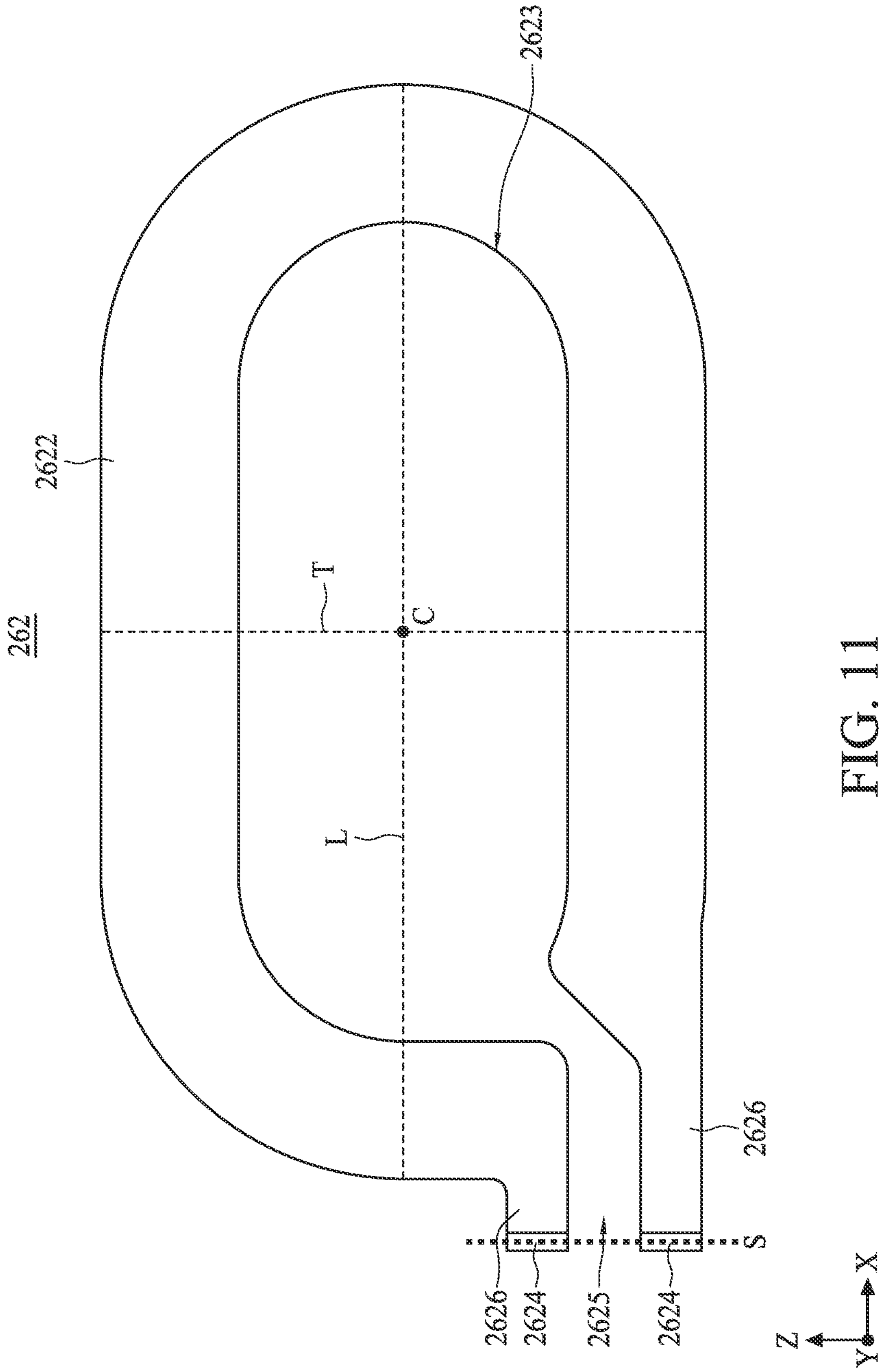
FIG. 11 is a top view of the conductive plate in accordance with an embodiment of the present application.

The two pins 2624 of each of the conductive plates 262 may be at different planes S1 and S2, both have a normal direction of the second direction X. Since the opening 2625 is located at the curved segment of the main body 2622 and the pins 2624 are located on the different planes S1 and S2, therefore the intermediate segments 2626 of the conductive plate 262, between the main body 2622 and the pins 2624, have different lengths. In some embodiments, the pins 2624 of the conductive plate 262 may be arranged side by side at the same plane S parallel to the minor axis T through appropriate design of the two intermediate segments 2626. As shown in FIG. 11, by appropriately arranging the position of the conductive plate 262 of FIGS. 10 and 11 among the secondary windings 260*a* and 260*b* (e.g., the conductive plate 262 of FIG. 10 sandwiched by two of the conductive plates 262 of FIG. 11), the overall size of the transformer 220 can be reduced. Additionally, the two pins 2624 of the conductive plate 262 may have the same width (a length in a Z direction) to facilitate the formation of openings 212 on the circuit board 210 for the pins 2624 to insert into. In some embodiments, the two pins 2624 and the two intermediate segments 2626 of each of the conductive plates 262 can have the same widths, and a width of at least one end of the main body 2622 may gradually decrease before connecting to one of the intermediate segments 2626.

Referring again to FIGS. 5 to 9, in the winding assembly 240, the coil sections 252 of the primary winding 250 and the main bodies 2622 of the conductive plates 262 of the secondary windings 262*a* and 262*b* are arranged in a staggered configuration. The intermediate sections 254 of the primary winding 250 pass through the openings 2625 of respective conductive plates 262 for connecting to the coil sections 252 disposed above and beneath the respective conductive plates 262. After the magnetic core assembly 230 and the winding assembly 240 are assembled, the middle post 2328 of the first magnetic core member 232 is surrounded by the staggeredly arranged coil sections 252 and the main bodies 2622 of the conductive plates 262 (as shown in FIG. 5), so that when the power conversion module 200 operates, the induced magnetic flux can be evenly distributed, thereby achieving optimal flux induction (i.e., reducing the leakage inductance). For example, leakage inductance of the winding assembly 240 comprised of coil sections 252 of seven primary windings 250 and main bodies 2622 of eight conductive plates 262 is in a range of about 1 μH to 5 μH.

Referring again to FIGS. 3 and 6, in the winding assembly 240, the pins 2624 of the conductive plates 262 are arranged at opposite sides of the middle post 2328. For example, the pins 2624 of the conductive plates 262 in the secondary winding 260*a* are at one side of the middle post 2328, and the pins 2624 of the conductive plates 262 in the secondary windings 260*b* are at the other side of the middle post 2628. When the winding assembly 240 has the same number of conductive plates 262 in the secondary windings 260*a* and 260*b*, an amount of the pins 2624 at one side of the middle post 2328 equal an amount of the pins 2624 distributed at the other side of the middle post 2328. Under the premise that the secondary windings 260*a* and 260*b* have the same number of conductive plates 262, the secondary windings 260*a* and 260*b* have the same power-outputting abilities if the connection configurations of the conductive plates 262 in the secondary windings 260*a* is the same as the connection configurations of the conductive plates 262 in the secondary windings 260*b*.

Figure 12B:
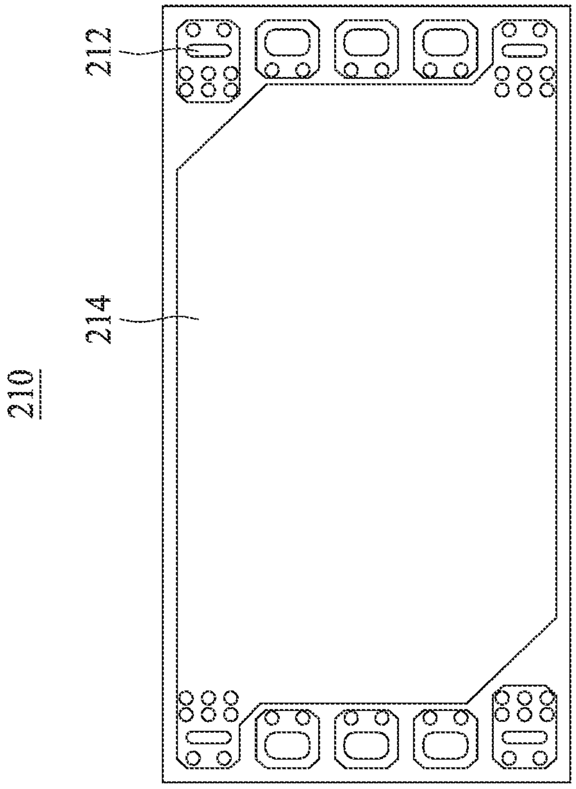
FIG. 12B is a bottom view of a circuit board in accordance with an embodiment of the present application.
Figure 12A:
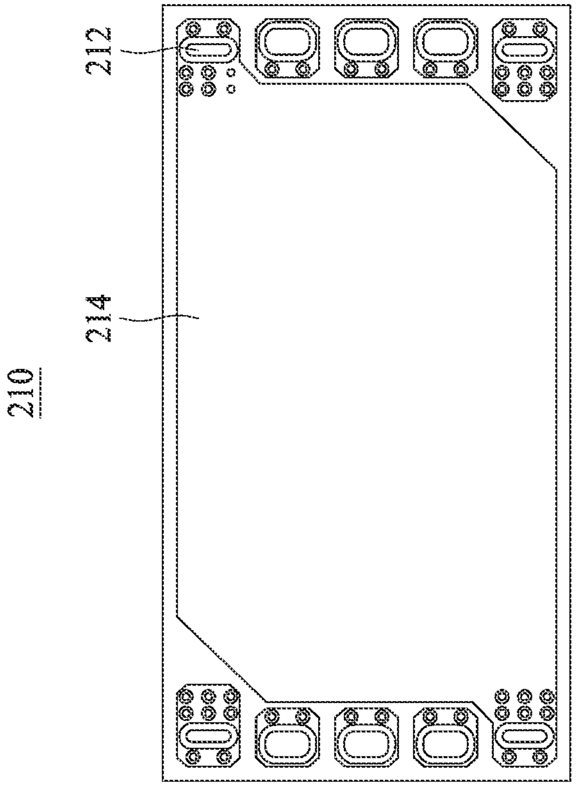
FIG. 12A is a bottom view of a circuit board in accordance with an embodiment of the present application.

FIGS. 12A and 12B are bottom views of the circuit board. The secondary windings 260*a* and 260*b* of the winding assembly 240 can be electrically connected in parallel or in series through the conductive pattern 214 on the circuit board 210, wherein the pins 2624 of each of the conductive plates 262 of the secondary windings 260*a* and 260*b* may be electrically coupled to the conductive pattern 214 around the respective opening 212 by using solder. For example, when connecting the winding assembly 240 to the circuit board 210 shown in FIG. 12A, the secondary windings 260*a* and 260*b* can be electrically connected in series when the common-polarity terminal of the secondary winding 260*a* is electrically coupled to the conductive pattern 214 at the top-left corner of the circuit board 210, the opposite-polarity terminal of the secondary winding 260*a* is electrically coupled to the conductive pattern 214 at the bottom-left corner of the circuit board 210; the common-polarity terminal of the secondary winding 260*b* is electrically coupled to the conductive pattern 214 at the top-right corner of the circuit board 210, and the opposite-polarity terminal of the secondary winding 260*b* is electrically coupled to the conductive pattern 214 at the bottom-right corner of the circuit board 210. Similarly, the secondary windings 260*a* and 260*b* can be electrically coupled in parallel when the common-polarity terminals of the secondary windings 260*a* and 260*b* are electrically coupled to conductive pattern 214 located at the top-left and bottom-right corners of the circuit board 210, respectively. The circuit board 210 may be a printed circuit board. The circuit board 210 is provided with the conductive pattern 214 not only for electrically connecting the secondary windings 260*a* and 260*b* in parallel or in series, but also for electrically connecting the conductive plates 262 of the secondary winding 260*a* or 260*b* in series.

As shown in FIG. 3, distances between the circuit board 210 and the intermediate segments 2626 of the conductive plates 262 of the secondary windings 260*a* and 260*b* may progressively increase in a counterclockwise direction. Referring to FIGS. 3 and 6, in a pair of conductive plates 262, whose openings 2625 are disposed closest to each other, two of the intermediate segments 2626 of the conductive plates 262 are disposed on different horizontal planes, wherein the normal directions of the horizontal planes are the first direction Y, so as to allow the one intermediate segment 2626 of the conductive plates 262 to be arranged above or below another intermediate segment 2626 of the conductive plates 262. In some embodiments, the intermediate segment 2626 of the conductive plate 262 with the opening 2625 arranged farther away from the major axis L is located above the intermediate segment 2626 of the other conductive plate 262 with the opening 2625 arranged closer to the major axis L. Additionally, the two pins 2624 connected to the above mentioned intermediate segments 2626 may be on different planes having normal directions of the second direction X. In other words, if the pins 2624 on different planes having normal directions of the second direction X having the same widths, the front pin 2624 can completely shield the other pin 2624 when viewed from the second direction X. For example, when the secondary winding 260*a* or 260*b* includes four conductive plates 262 and eight pins 2624, the amount of the pins 2624 that can be seen from the side view of the winding assembly 240 is five (as shown in FIGS. 8 and 9).

Moreover, as shown in FIGS. 2 to 4, the two pins 2624 of the two conductive plates 262 on different planes having the normal directions of the second direction X may be partially contacted to each other in order to make the two conductive plates 262 in series connection, thereby reducing the complexity of the circuit traces on the circuit board 210. The openings 212 of the circuit board 210 may be designed for fastening the two pins 2624 in contact with each other, so as to prevent the transformer 220 from malfunction caused by poor contact of or disconnecting of the pins 2624 during transportation or operation. In some embodiments, adhesive with conductive property may be applied to the contact interface between the pins 2624, so as to prevent the pins 2624 in serial connection from disconnecting from each other which leads to open-circuit.

Figure 13:
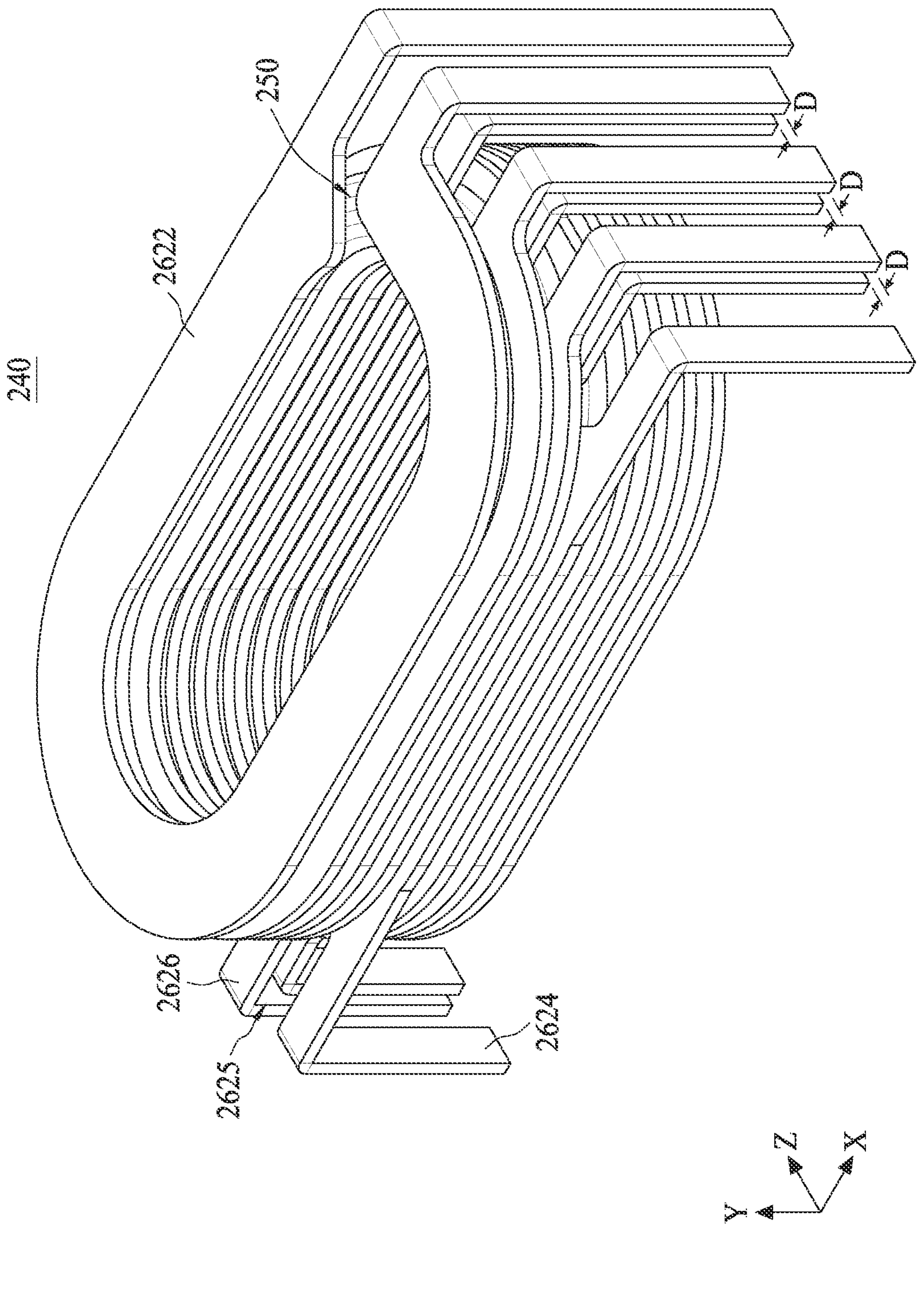
FIG. 13 is a perspective view of a winding assembly in accordance with an embodiment of the present application.
Figure 14:
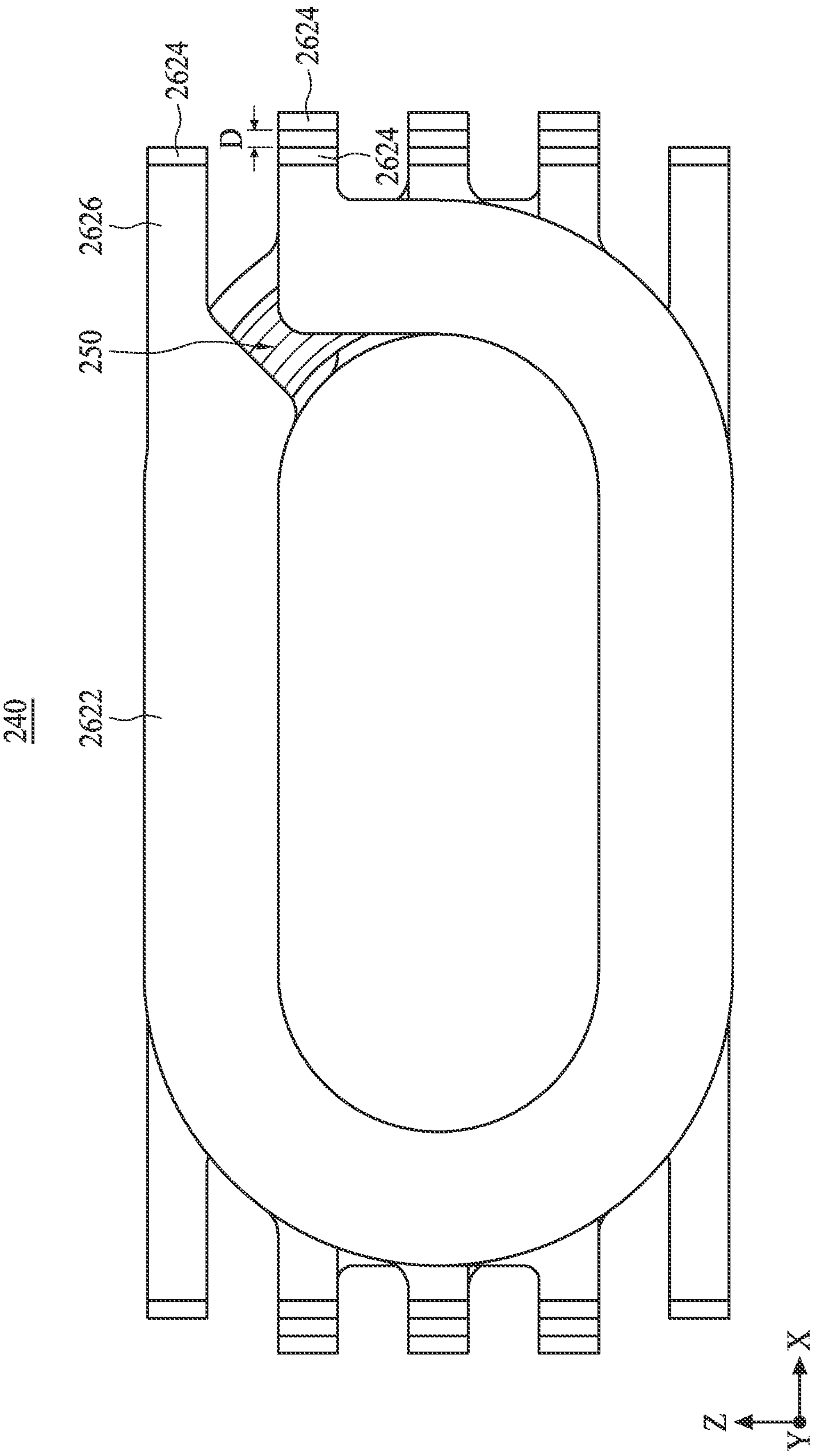
FIG. 14 is a bottom view of the winding assembly in accordance with an embodiment of the present application.
Figure 15:
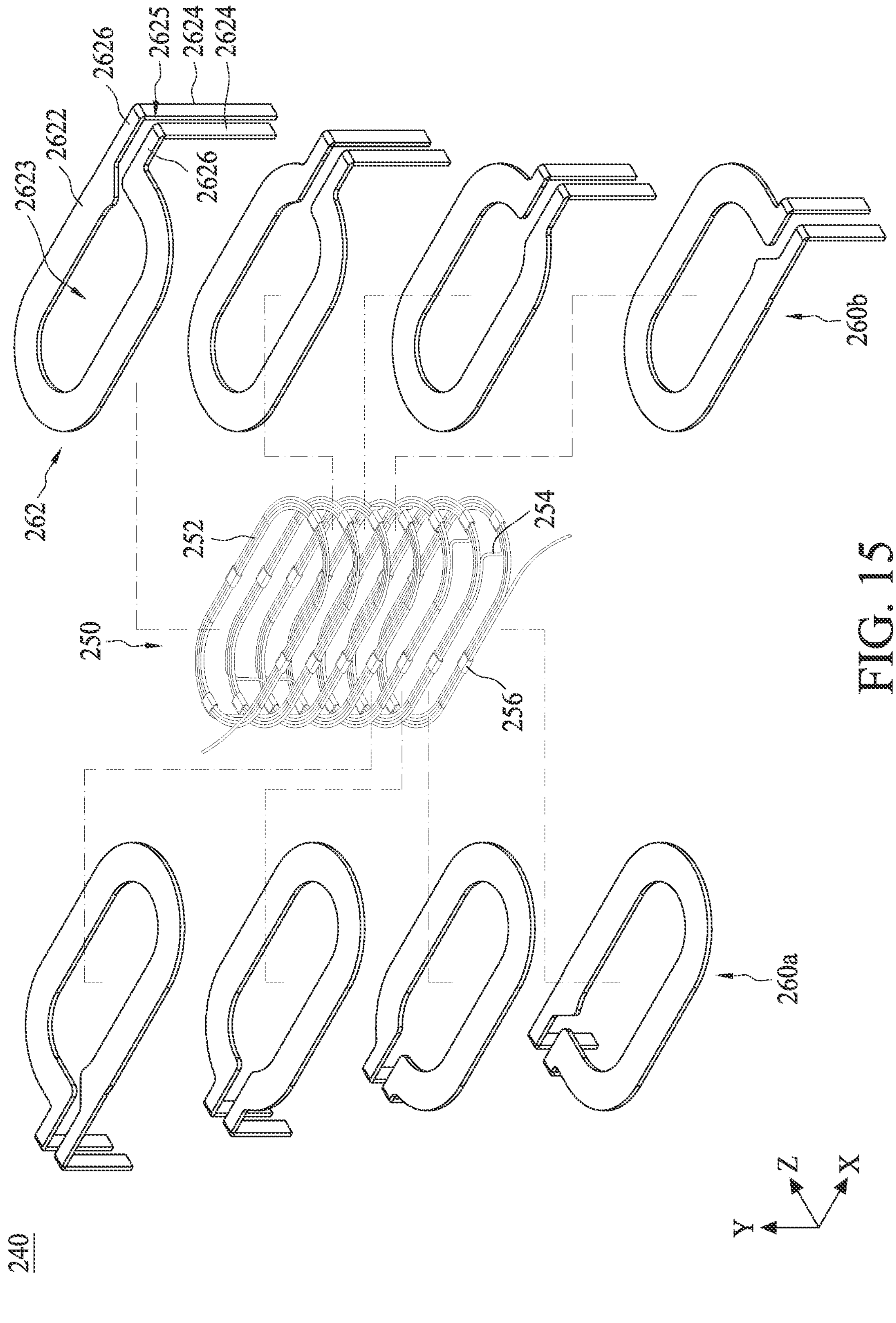
FIG. 15 is an exploded view of the winding assembly in accordance with an embodiment of the present application.

FIG. 13 is a perspective view of a winding assembly 240, FIG. 14 is a bottom view of the winding assembly 240, and FIG. 15 is an exploded view of the winding assembly 240. Referring to FIGS. 13 to 15, within the secondary windings 260*a* or 260*b,* all the pins 2624 of the conductive plates 262 are designed to have a same thickness (a length in the second direction X) and a same width (a length in the third direction Z). In a pair of conductive plates 262, whose openings 2625 are closest to each other, projections of two pins 2624, in different conductive plates 262, on the YZ plane (i.e. the plane having the normal direction of the first direction X) overlaps with each other, while the projections of the two pins 2624 on the XY plane (i.e. the plane having the normal direction of the first direction Z) does not overlap with each other, and are separated from each other by a distance D. In other words, the above mentioned two pins 2624 of the two conductive plates 262 are distanced by the distance D, thereby reducing the complexity to assemble the winding assembly 240 on the circuit board 210. The conductive plates 262 of the secondary windings 260*a* or 260*b* may be electrically connected in series or in parallel through using the conductive pattern on the circuit board 210.

The present application provides a power conversion module 200 including a transformer 220. The transformer 220 includes a primary winding 250 and two secondary windings 260*a* and 260*b;* the primary winding 250 includes a plurality of coil sections 252, the secondary windings 260*a* and 260*b* include a plurality of conductive plates 262, and the coil sections 252 and main bodies 2622 of the conductive plates 262, in a staggered configuration, are arranged in a magnetic core assembly 230, so that the leakage inductance can be reduced effectively. In addition, the conductive plates 262 of the secondary windings 260*a* and 260*b* are connected to the circuit board 210 through pins 2624 distributed at opposite sides of a middle post 2328 of the magnetic core assembly 230, so that the secondary windings 260*a* and 260*b* are connected in series or in parallel. The transformer 220 with aforementioned configuration is not only compact, but also has improved flexibility.

Although the present application and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, compositions of matter, means, methods and steps described in the specification. As one of ordinary skill in the art will readily appreciate from the present disclosure, processes, machines, manufacture, compositions of matter, means, methods or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods and steps.

What is claimed is:

1. A power conversion module, comprising:
- a circuit board including at least one conductive pattern disposed thereon; and
- a transformer, disposed on the circuit board, the transformer including:
  - a primary winding, including at least one coil section;
  - a plurality of secondary windings, including a plurality of conductive plates, each of the conductive plates including:
    - two pins, extending along a first direction, wherein the transformer is physically connected to the circuit board through the two pins for electrically connecting to the circuit board;
    - a single-layered main body, having an opening; and
    - two intermediate segments, extending along a second direction between the single-layered main body and the two pins, wherein the single-layered main body is coupled to the two pins via the two intermediate segments, and the two intermediate segments are located at both sides of the opening, and the second direction is perpendicular to the first direction; and,
  - a magnetic core assembly, including a middle post, wherein the coil section and the single-layered main bodies of the conductive plates are arranged in a staggered configuration, the middle post passes through a center of the coil section and the single-layered main bodies of the conductive plates,
  - wherein the secondary windings are divided into a first group and a second group, and the conductive plates of the first group are connected in series and the conductive plates of the second group are connected in series,
  - wherein the pins of the conductive plates of the first group and the pins of the conductive plates of the second group are respectively arranged on two opposite sides of the middle post,
  - wherein in the second direction, a distance from the pins of the conductive plates of the first group to the pins of the conductive plates of the second group is greater than a distance from the pins of the conductive plates of the first group to the middle post.

2. The power conversion module of claim 1, wherein the primary winding is wound spirally using a conductive wire, and includes a plurality of coil sections and a plurality of intermediate sections, the coil sections are correspondingly wound along a plurality of planes without being closed-up, the coil sections are electrically coupled to each other through the intermediate sections, and normal directions of the planes are all parallel to the first direction.

3. The power conversion module of claim 2, wherein a thickness of each of the coil sections is equal to a diameter of the conductive wire.

4. The power conversion module of claim 1, wherein an amount of the pins of the conductive plates of the first group is equal to an amount of the pins of the conductive plates of the second group.

5. The power conversion module of claim 1, wherein the single-layered main body has a major axis and a minor axis perpendicular to the major axis, and the two pins of each of the conductive plates are at different planes having normal directions of the second direction.

6. The power conversion module of claim 1, wherein the single-layered main body has a major axis and a minor axis perpendicular to the major axis, and the pins of each of the conductive plates are at a same plane having a normal direction of the second direction.

7. The power conversion module of claim 1, wherein the single-layered main body has a major axis and a minor axis perpendicular to the major axis, and the opening is closer to ends of the major axis than ends of the minor axis.

8. The power conversion module of claim 7, wherein the single-layered main body is straight at the ends of the minor axis, and is not straight at the ends of the major axis, and the two intermediate segments of each of the conductive plates have different lengths.

9. The power conversion module of claim 1, wherein in each of the first and second groups, one of the two pins of each one of the conductive plates is in contact with one of the two pins of another one of the conductive plates, so that the conductive plates are electrically connected in series.

10. The power conversion module of claim 1, wherein the secondary windings are electrically connected in parallel or in series through the conductive pattern.

11. The power conversion module of claim 1, wherein the magnetic core assembly comprises:

a first magnetic core member, including the middle post passing through the primary winding and the single-layered main bodies, and two side posts disposed at opposite sides of the middle post; and a second magnetic core member, disposed on top of the primary winding and the secondary windings and contacting the side posts.

12. The power conversion module of claim 1, wherein the single-layered main body, the two intermediate segments, and the two pins of each of the conductive plates are integrally formed.

* * * * *